United States Patent
Hsu

(10) Patent No.: US 9,631,728 B1
(45) Date of Patent: Apr. 25, 2017

(54) TOUCH-TYPE GAS CONTROL VALVE

(71) Applicant: POLARIS ARMAMENT INDUSTRY CORP., Taipei (TW)

(72) Inventor: Yu-Min Hsu, Taipei (TW)

(73) Assignee: POLARIS ARMAMENT INDUSTRY CORP., Taipei (TW)

(*) Notice: Subject to any disclaimer, the term of this patent is extended or adjusted under 35 U.S.C. 154(b) by 35 days.

(21) Appl. No.: 14/940,148

(22) Filed: Nov. 13, 2015

(51) Int. Cl.
| F16K 1/12 | (2006.01) |
| F16K 1/34 | (2006.01) |
| F16K 1/46 | (2006.01) |
| F16K 25/00 | (2006.01) |

(52) U.S. Cl.
CPC ............ *F16K 1/12* (2013.01); *F16K 1/34* (2013.01); *F16K 1/46* (2013.01); *F16K 25/00* (2013.01)

(58) Field of Classification Search
CPC ..... F16K 1/12; F16K 1/32; F16K 1/34; F16K 1/36; F16K 1/46; F16K 25/00
USPC .............. 251/321–323, 333–334, 337, 900
See application file for complete search history.

(56) References Cited

U.S. PATENT DOCUMENTS

| 630,184 | A | * | 8/1899 | Cooke | F16K 21/04 |
| | | | | | 251/322 |
| 712,249 | A | * | 10/1902 | Briggs Jr. | B60T 17/043 |
| | | | | | 251/322 |
| 950,801 | A | * | 3/1910 | Barr | F16K 21/04 |
| | | | | | 251/322 |
| 4,316,600 | A | * | 2/1982 | Parise | F16K 1/34 |
| | | | | | 251/333 |
| 5,791,328 | A | * | 8/1998 | Alexander | F41B 11/723 |
| | | | | | 124/73 |
| 5,853,071 | A | * | 12/1998 | Robinson | B60T 11/30 |
| | | | | | 251/323 |
| 6,237,893 | B1 | * | 5/2001 | Rose | F16K 15/063 |
| | | | | | 251/323 |
| 6,409,150 | B2 | * | 6/2002 | Sullivan, Sr. | F16K 1/12 |
| | | | | | 124/73 |
| 2005/0082508 | A1 | * | 4/2005 | Dziob | F16K 1/12 |
| | | | | | 251/323 |

* cited by examiner

*Primary Examiner* — John Bastianelli
(74) *Attorney, Agent, or Firm* — Leong C. Lei

(57) ABSTRACT

The touch-type gas control valve contains a button, a spring, a hollow body, an O-shaped ring, and a stem. The button is configured to be slidable in and out of a top side of the body. The body has a number of outlets around the lower section's circumference and an inlet on a bottom side of the body. The spring is housed inside the body. The ring is positioned around the inlet. The stem has a semi-spherical head at a bottom end and threads around a top section. The stem runs through the ring, into the body through the inlet, through the spring, and is fastened into the bottom side of the button. The ring is sandwiched between the semi-spherical head and the bottom side of the body by the resilience of the spring when the button is not depressed.

1 Claim, 2 Drawing Sheets

TOUCH-TYPE GAS CONTROL VALVE

BACKGROUND OF THE INVENTION (a) Technical Field of the Invention

The present invention is generally related to gas control valves, and more particular to a touch-type gas control valve that instantly releases highly pressurized gas.

(b) Description of the Prior Art

For a conventional touch-type gas control valve, simple and robust structure is particularly required, considering its usage frequency and restoration speed, so as to meet realistic requirement. Lower production cost and convenient maintenance are also of concern to the manufacturers of the gas control valve. In addition, if the gas control valve is applied as a vital component in an intensely operated apparatus, such as a game rifle, the security, robustness, and effectiveness of the gas control valve should be even more important.

The present invention therefore provides a novel touch-type gas control valve. By touching a button which engages a stem to open an inlet, highly pressurized gas immediately floods a body of the gas control valve, and then spurts out of a number of outlets perpendicular to the inlet.

SUMMARY OF THE INVENTION

The touch-type gas control valve contains a button, a spring, a hollow body, an O-shaped ring, and a stem. The body contains, from top to bottom, a flange, a bulging middle section, a lower section; a plurality of outlets around the lower section's circumference, and an inlet on a bottom side of the body.

The button is configured to be slidable in and out of a top side of the body.

The spring is housed inside the body, having a top end against a bottom side of the button and a bottom end against the bottom side of the body.

The stem has a stem body, a semi-spherical head at a bottom end of the stem body, and threads around a top section of the stem body. The stem runs through the ring, into the body through the inlet, through the spring, and is fastened into the bottom side of the button.

The ring is positioned around the inlet and is sandwiched between the semi-spherical head and the bottom side of the body by the resilience of the spring when the button is not depressed.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
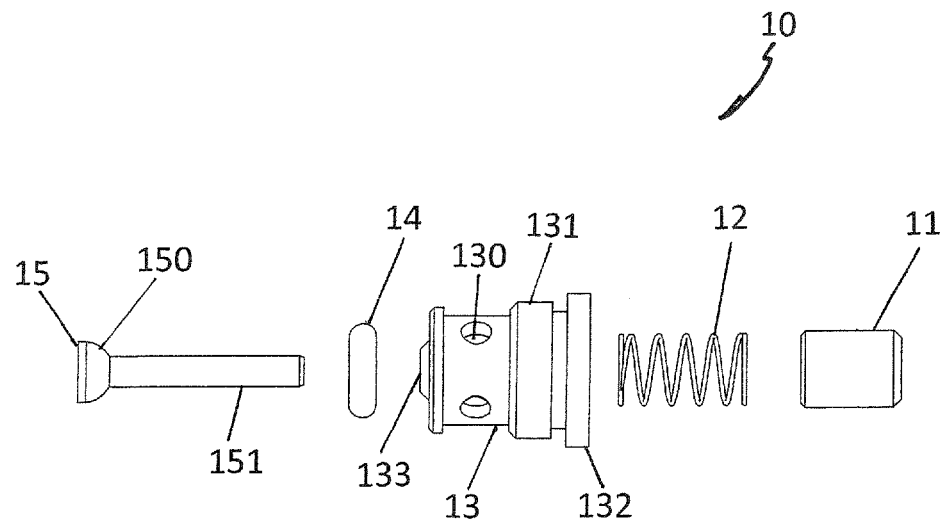
FIG. 1 is a perspective break-down diagram showing a touch-type gas control valve according to an embodiment of the present invention.

As shown in FIG. 1, a touch-type gas control valve 10 according to an embodiment of the present invention contains a button 11, a spring 12, a body 13, an O-shaped ring 14, and a stem 15. The button 11 is configured to be slidable in and out of a top side of the body 13. The spring 12 is housed inside the body 13. The body 13 contains, from top to bottom, a flange 132, a bulging middle section 131, a number of outlets 130 around a lower section 135's circumference, and an inlet 133 on a bottom side of the body 13. The stem 15 has a stem body 151, a semi-spherical head 150 at a bottom end of the stem body 151, and threads around a top section of the stem body 151 (not shown). The stem 15 runs through the ring 14, into the body 13 through the inlet 133, through the spring 12, and is fastened into the bottom side of the button 11. The ring 14 is positioned around the inlet 133 and is sandwiched between the semi-spherical head 150 and the bottom side of the body 13 by the resilience of the spring 12. When the gas control valve 10 is configured on an apparatus and the stem 15 is pushed open by the button 11, highly pressurized gas injects into the gas control valve 10 through the inlet 133 and completely spurts out through the outlets 130. Then the resilience of the spring 12 restores the semi-spherical head 150 of the stem 15 to tightly close the inlet 133 while the ring 14 provides air-tightness. In the meantime, the button 11 is also restored to an original location and the highly pressurized gas presses the stem 15 to reliably close the inlet 133.

Figure 2:
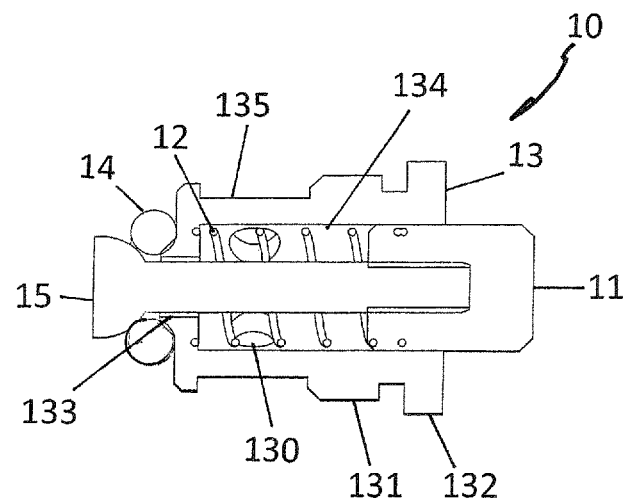
FIG. 2 is a sectional diagram showing the touch-type gas control valve of FIG. 1.

As shown in FIG. 2, the touch-type gas control valve 10 contains five parts: the button 11, the spring 12, the body 13, the ring 14, and the stem 15. The five parts are integrally assembled together and the assembly is configured in an apparatus's key position where the inlet 133 is located in a release path connecting a space where highly pressurized gas is stored. The flange 132 and the bulging middle section 131 are fixedly locked to the apparatus. To operate the gas control valve 10, the button 11 is touched and pushed into a channel 134 of the body 13. The stem 15 is also driven downward and the inlet 133 is opened. The highly pressurized gas therefore enters into the body 13 through the inlet 133 and spurts out through the outlets 130. Usually a pipe is connected to the lower section 135 of the body 13 so as to direct the spurted gas.

Figure 3:
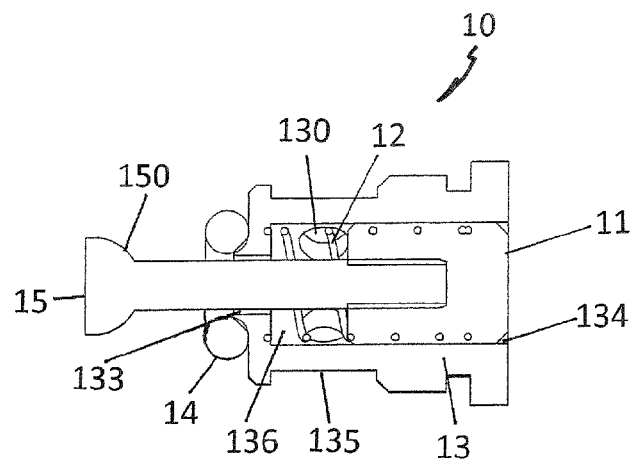
FIG. 3 is a sectional diagram showing the touch-type gas control valve of FIG. 1.

As shown in FIG. 3, the touch-type gas control valve 10 contains five parts: the button 11, the spring 12, the body 13, the ring 14, and the stem 15, integrally assembled together. When the button 11 is touched and pushed into the channel 134 of the body 13, the spring 12 is compressed until a space 136 is reserved in the body 13. The outlets 130 are configured around the space 136. As the semi-spherical head 150 is detached from the ring 14 around the inlet 133, the highly pressurized gas immediately floods the space 136 through the inlet 133. Through the pressure of the highly pressurized gas, together with the resilience of the spring 12, the button 11 and the stem 15 are synchronously restored to their original locations before the button 11 is touched. In the meantime, the highly pressurized gas spurts out of the outlets 130 and the pipe (not shown). A cycle of operation of the gas control valve 10 is as such completed.

Figure 4:
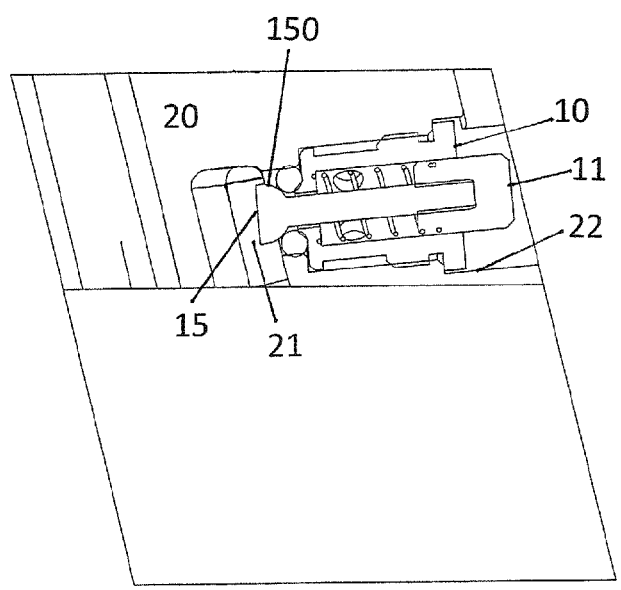
FIG. 4 is a sectional diagram showing the touch-type gas control valve of FIG. 1 applied to an apparatus.

As shown in FIG. 4, the gas control valve 10 is configured inside an apparatus 20 which provides F-like channels. The bottom end of the gas control valve 10 is connected to a chamber 21 for the expansion of highly pressurized gas, whereas the button 11 is configured in a duct 22. The semi-spherical head 150 blocks an outlet of the chamber 21 so that the chamber 21 is sealed tightly similar to what is shown in FIG. 2. When the button 11 is depressed, the operation of the gas control valve is similar to what is shown in FIG. 3.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A touch-type gas control valve, comprising a button, a spring, a hollow body, an O-shaped ring, and a stem; wherein
  the body comprises, from top to bottom, a flange, a bulging middle section, a lower section; a plurality of outlets around the lower section's circumference, and an inlet on a bottom side of the body;
  the button is configured to be slidable in and out of a top side of the body;
  the spring is housed inside the body, having a top end against a bottom side of the button and a bottom end against the bottom side of the body;
  the stem has a stem body, a semi-spherical head at a bottom end of the stem body, and threads around a top section of the stem body; the stem runs through the ring, into the body through the inlet, through the spring, and is fastened into the bottom side of the button; and
  the ring is positioned around the inlet and is sandwiched between the semi-spherical head and the bottom side of the body by the resilience of the spring when the button is not depressed.

* * * * *